United States Patent [19]
Weiler et al.

[11] Patent Number: 6,026,380
[45] Date of Patent: Feb. 15, 2000

[54] SYSTEM AND METHODS FOR TRACKING COPY COUNT INFORMATION FROM A PLURALITY OF PHOTOCOPY MACHINES

[75] Inventors: Christopher J. Weiler, Springfield, Va.; Brian D. Skinner, Davidsonville, Md.; Jeffrey B. Greenspan, Annandale; Lewis Komarow, Falls Church, both of Va.

[73] Assignee: On-Site Sourcing, Inc., Arlington, Va.

[21] Appl. No.: 08/955,086

[22] Filed: Oct. 21, 1997

[51] Int. Cl.[7] ...................................................... G06F 17/60
[52] U.S. Cl. ................... 705/34; 705/30; 399/9; 399/8; 399/80; 355/97; 355/133
[58] Field of Search .................... 399/9, 10, 11, 399/12, 13, 14, 15, 16–28, 29–37; 705/30, 34

[56] References Cited

U.S. PATENT DOCUMENTS

| | | | |
|---|---|---|---|
| 4,497,037 | 1/1985 | Kato et al. ............................... | 364/900 |
| 4,999,672 | 3/1991 | Rice, Jr. et al. ......................... | 355/202 |
| 5,708,908 | 1/1998 | Hirata et al. ............................. | 399/8 |
| 5,708,909 | 1/1998 | Yamashita et al. ...................... | 399/8 |
| 5,715,496 | 2/1998 | Sawada et al. .......................... | 399/8 |
| 5,752,125 | 5/1998 | Yamashita et al. ..................... | 399/8 |
| 5,784,663 | 7/1998 | Hayashi et al. .......................... | 399/8 |
| 5,784,664 | 7/1998 | Nakamura et al. ..................... | 399/8 |

*Primary Examiner*—Allen R. MacDonald
*Assistant Examiner*—Akiba Robinson-Boyce
*Attorney, Agent, or Firm*—Finnegan, Henderson, Farabow, Garrett & Dunner, LLP

[57] ABSTRACT

A photocopy count system and method which records usage information for accounting and billing purposes. The photocopy tracking system comprises a plurality of remote mini-terminals, a multiport serial board, and a central control computer. Billing identifier information entered at a remote mini-terminal is received at the central control computer where it is processed for verification of validity. If the billing information is valid, the central control computer generates a copier enable signal which is received at the remote mini-terminal to enable the associated photocopier. As each photocopy event occurs, the copy signal is detected by the central control computer. When copying is completed, the copy count and associated billing information is stored at the control computer for later accounting and billing use. The control and processing functions are centralized so as to reduce the cost to install and maintain the system.

15 Claims, 5 Drawing Sheets

SYSTEM AND METHODS FOR TRACKING COPY COUNT INFORMATION FROM A PLURALITY OF PHOTOCOPY MACHINES

BACKGROUND OF THE INVENTION

The present invention is directed to office environments where there is a need to monitor photocopy usage from a plurality of photocopiers for accounting and billing purposes.

A known photocopy count system consists of a plurality of remote computers, each having a data entry keyboard. Each remote computer is connected to a photocopier to enable operation of the photocopier and is also connected to a central control computer(s) by way of a computer network connection. The central control computer receives copy count information detected and stored by each remote computer based on the usage of the photocopier associated therewith.

A major drawback of this type of copy count system is that each remote computer is quite expensive and one is needed at each location of a photocopier, which adds significantly to the cost of the system. Furthermore, the cost of maintaining and repairing the system is high because a failed remote computer must be replaced with another one of the same cost. Adding photocopiers to a system is also costly for the same reasons. It is desirable to provide a system for tracking photocopy count information which is inexpensive to install, maintain, and repair.

SUMMARY OF THE INVENTION

Briefly, the present invention is directed to a tracking system and method which records usage information, such as photocopy count information, for accounting and billing purposes. The tracking system comprises a plurality of remote mini-terminals, a multiport serial board, and a central control computer. In order to activate the photocopier, billing identifier information is entered into the remote mini-terminals which are located proximate and connected to each photocopier. The billing identifier information is received at the central control computer where it is processed for verification of validity. If the billing information is valid, the central control computer generates a copy enable signal which is received at the remote mini-terminal. The photocopier is then activated upon receiving the copy enable signal from the remote mini-terminal. As each photocopy event occurs, the copy signal is detected by the central control computer. When copying is completed, the copy count and associated billing information is stored at the control computer for later accounting and billing use.

An object of the present invention is to provide a tracking system for monitoring usage at a plurality of photocopiers for accounting and billing purposes.

Another object of the present invention is to provide a tracking system which is less expensive to install, maintain and repair by centralizing the control and computing functions.

The above and other objects and advantages of the present invention will become more readily apparent when reference is made to the following description, taken in conjunction with the accompanying drawings.

DETAILED DESCRIPTION OF THE DRAWINGS

Figure 1:
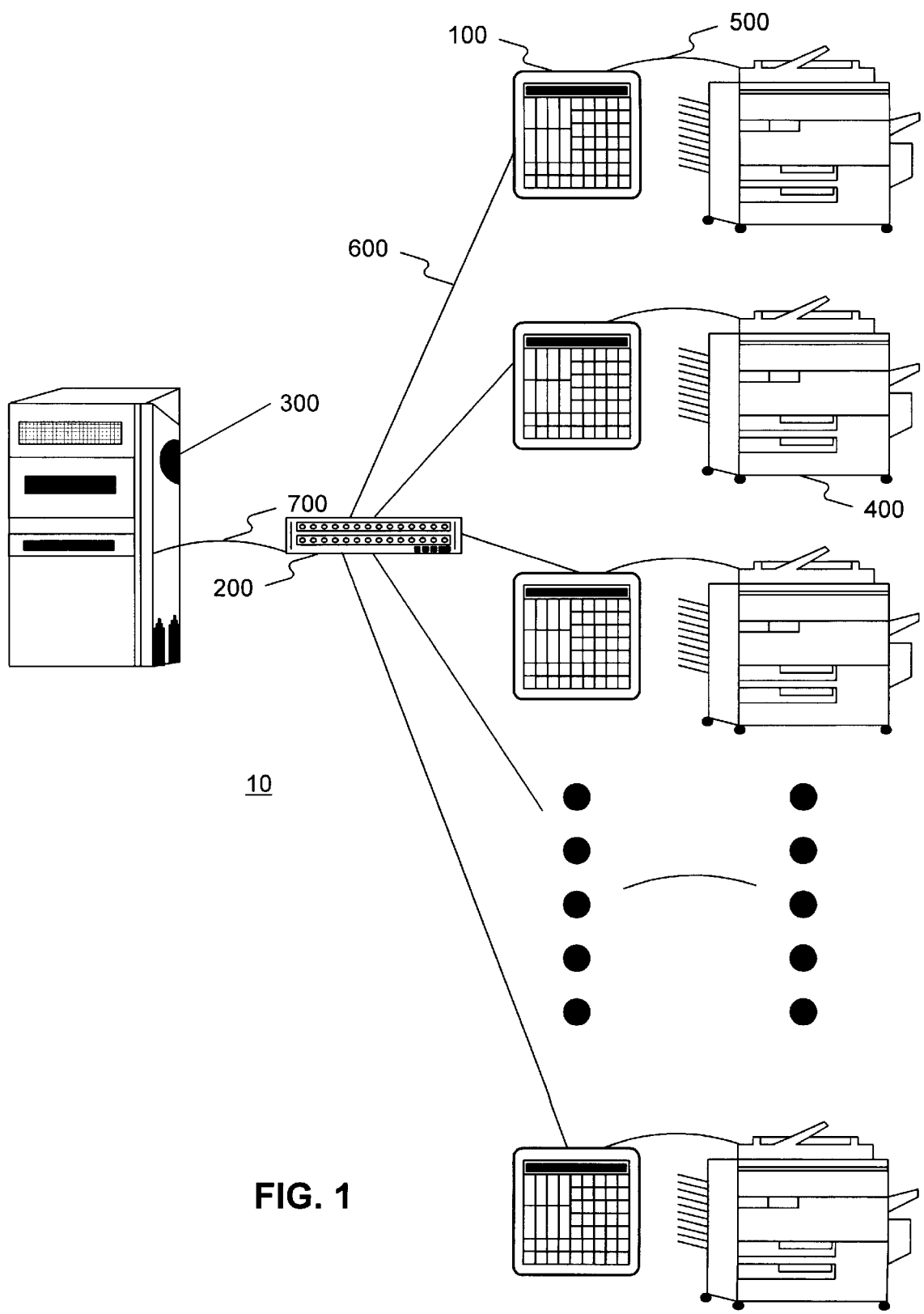
FIG. 1 is a block diagram of the tracking system according to the present invention.

Referring first to FIG. 1, the photocopy tracking system 10 of the present invention comprises a plurality of remote mini-terminals 100, a multiport connection device 200, and a central control computer 300. The remote mini-terminals 100 are connected to the multiport serial board 200 by primary serial cables 600. The photocopiers 400 are connected to the remote mini-terminals 100 by secondary serial cables 500. Each remote mini-terminal 100 is associated with a photocopier 400.

The primary serial cables 600 are standard RS-232 cables similar to cables used to connect a serial port to a terminal. The function of connecting with each remote mini-terminal is performed by a Digiboard PC/16em serial device consisting of a PC interface board which resides in the central control computer 300, and a connection device shown at 200 which connects to the remote mini-terminals 100. The serial cable 700 connects the central control computer 300 to the multiport connection device 200.

Figure 2:
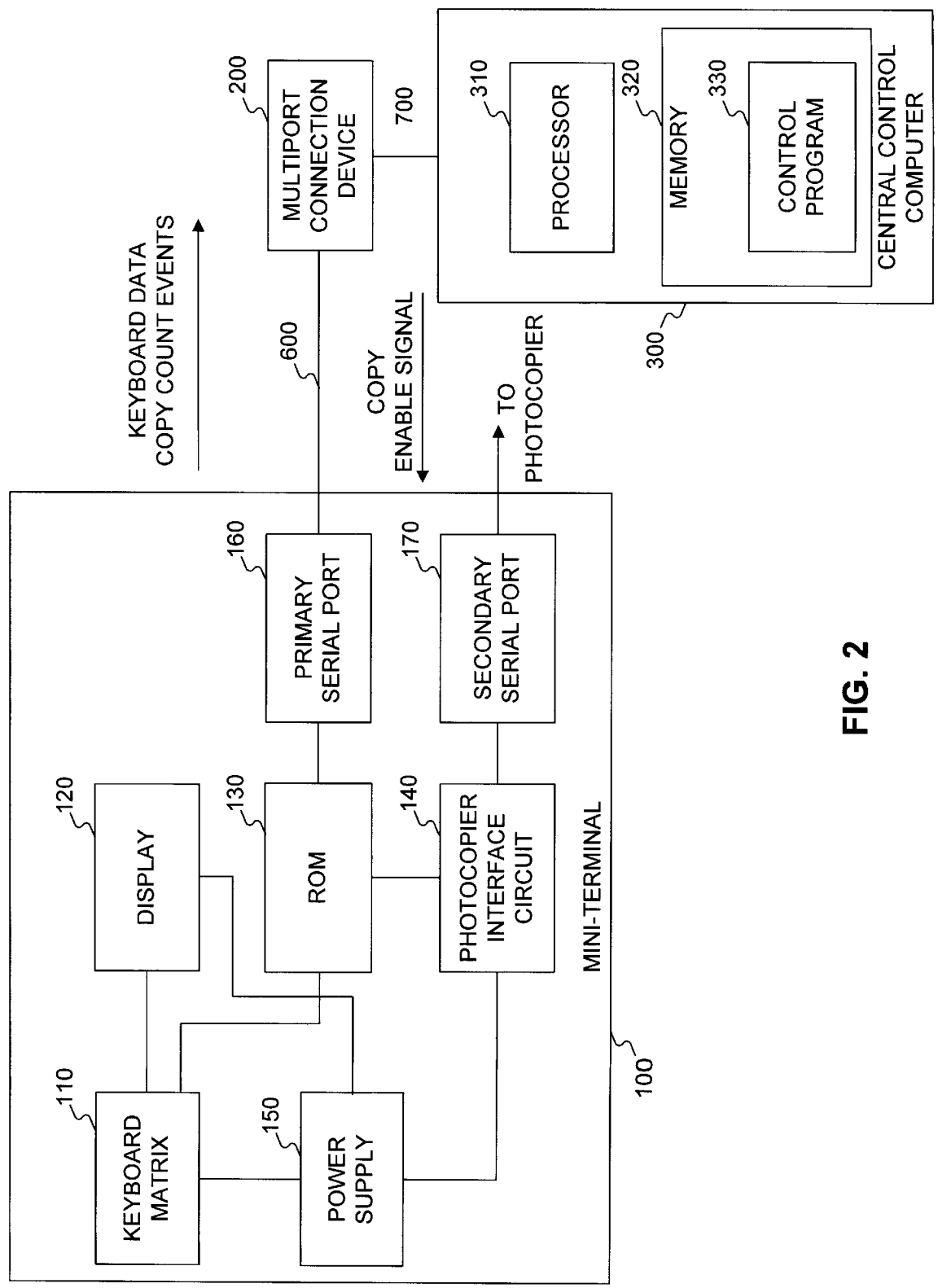
FIG. 2 is a block diagram showing the remote mini-terminal and central control computer of the system according to the present invention.

The remote mini-terminals 100 are keypad terminal devices, as opposed to computers. FIG. 2 illustrates the components of the remote mini-terminal 100 and the central control computer 300. The remote mini-terminal comprises a keyboard matrix 110, a display 120, a read only memory (ROM) 130, a photocopier interface circuit 140, a power supply 150. The multiport connection device 200 connects to the remote mini-terminal by way of a primary serial port 160, such as a standard RS-232 serial interface with a DB9 female connector. The remote mini-terminal 100 connects to a photocopier by way of a secondary serial port 170 which is a standard DIN style port similar to those that computer keyboards use. The mini-terminal 100 is a Touchtone 210 Mini-Terminal, for example. As is well known in the art, it is capable of recognizing and responding to certain control codes sent by the central control computer 300.

The mini-terminal 100 is modified in three ways from its "off-the-shelf" configuration. First, the keyboard matrix 110 is a full set of alphanumeric keys having two custom set of keycaps designed for use in different environments. Second, the photocopier interface circuit 140 has been added. Third, the ROM 130 is programmed to activate or deactivate the photocopier in response to a particular ASCII code. Specifically, the ROM 130 is programmed to respond to certain control codes from the central control computer 300 to enable to disable the associated photocopier by way of the photocopier interface circuit 140. The ROM 130 is also programmed, at the time of manufacture to assign certain functions or characters to keys of the keyboard matrix 110.

The central control computer 300 comprises a processor 310, memory 320, such as a read only memory (ROM) or random access memory (RAM), and a control program 330 stored in the memory 320. The control program 330 is executed by the processor 310 and controls the use of the photocopiers 400. A database of valid billing identifiers is included as part of the control program 330. Usage information is stored in association with billing identifier information in order to generate bills on a periodic basis. The central control computer 300 is a personal or business computer with sufficient computer power to service multiple remote mini-terminals 100. It is understood that the central control computer includes other components typical of computers, such as disk drives, etc. If the number of remote mini-terminals 100 exceed the maximum capable of being connected to the central control computer 300, an additional central control computer(s) 300 and/or additional multiport serial board(s) 200 are added to the system.

The central control computer 300 is capable of receiving data entered on the keyboard matrix 110 and translated to appropriate coded information for connection to it. It also generates certain control codes, such as ASCII characters, to be recognized by the ROM 130, and converted to an appropriate signal for the photocopier interface circuit 140. For example, an ASCII 19 will be recognized to generate a signal for the photocopier interface circuit 140 to enable the associated photocopier, whereas ASCII 20 will disable the associated photocopier.

Figure 3:
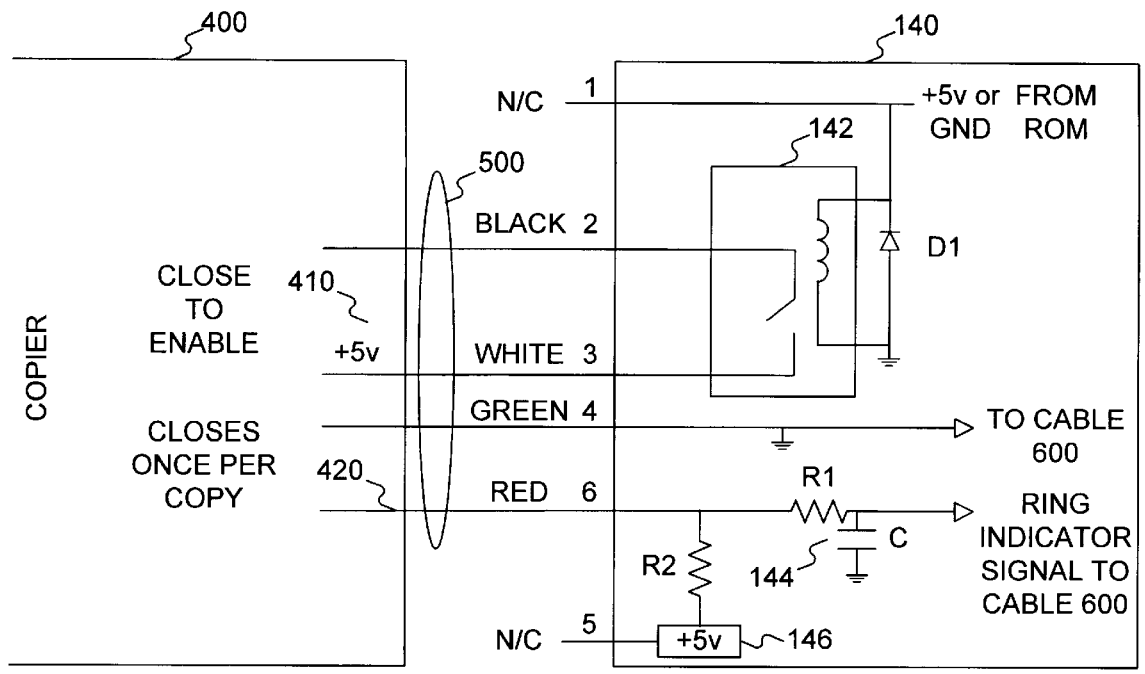
FIGS. 3 and 4 are schematic diagrams showing the copier interface circuit for connecting the remote mini-terminal to two types of photocopiers.

Turning to FIG. 3, a schematic diagram of the photocopier interface circuit 140 is shown. The photocopier interface circuit 140 is useful in interfacing with one type of photocopier which measures the copy count events indicated by closing of a switch located inside the photocopier 400. This is typical of how connection is made to photocopiers manufactured by Xerox Corporation. The connection to the photocopier interface circuit 140 is by way of the secondary serial cable 500. The photocopier interface circuit 140 comprises a relay 142 and a low-pass filter 144 comprising a resistor R1 and capacitor C. A protection diode D1 is built-in to the relay 142. The diode D1 protects against reverse inductive loading. The relay 142 is connected to an enable circuit 410 in the photocopier 400 by a first pair of conductors in the secondary serial cable 500 that connect to pins 2 and 3 of the photocopier interface circuit 140. The relay 142 is a single pole single throw (SPST) relay, for example.

The photocopier 400 further comprises an actuation circuit 420 which closes for each photocopy event. The low-pass filter 144 is connected to the actuation circuit 410 by a second pair of conductors of the secondary serial cable 500 that connect at pins 4 and 6 of the photocopier interface circuit 140. A 5-volt voltage source 146, which is derived from the power supply 150, is connected to the low-pass filter 144 via resistor R2, so that the resting or idle state of a copy event signal is high. The output of the filter 144 is a ring indicator signal that is coincident with each photocopy event of the associated photocopier 400. The ring indicator signal is also referred to as the copy event signal.

Figure 4:
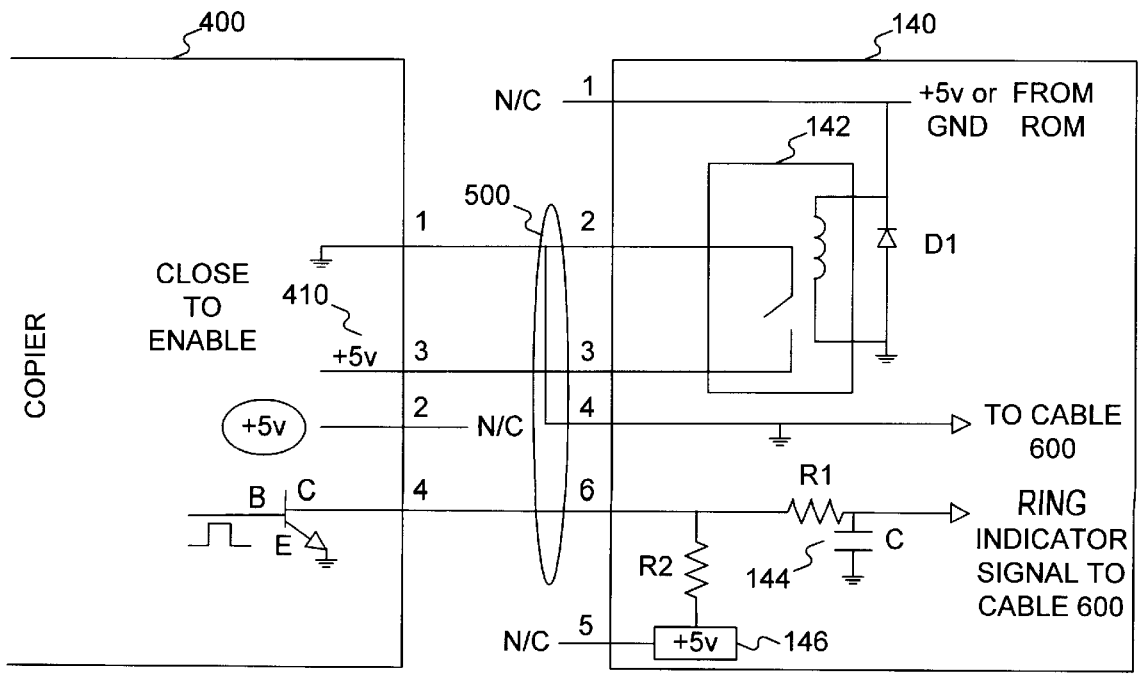

FIG. 4 is a schematic diagram of the photocopier interface circuit 140 for another type of photocopier in which the copy count events are indicated by a pulse signal generated by the photocopier 400. This is typical of photocopiers manufactured by Canon, Inc. The photocopier interface circuit 140 is identical to that of FIG. 3. However, the ring indicator signal is generated in response to the pulse signal generated by the photocopier 400 as shown in FIG. 4.

Important to the present invention is the fact that the remote mini-terminal 100 is not a computer. It does not include a processor, and therefore is much less expensive than the remote computers used in the prior art photocopy tracking system. Moreover, the remote mini-terminal 100 relays usage information, and detects the copy enable signal and in response enables operation of an associated photocopier.

The values and specifications for the circuit elements shown in FIGS. 3 and 4 may vary depending on the type of photocopier. The following are specifications for suitable circuit elements:

| R1 | 1–2kΩ |
|---|---|
| C1 | 2.2 μF |
| R2 | 100Ω |
| Relay 142 | SPST Relay-Radio Shack #275-232 |

Figure 5:
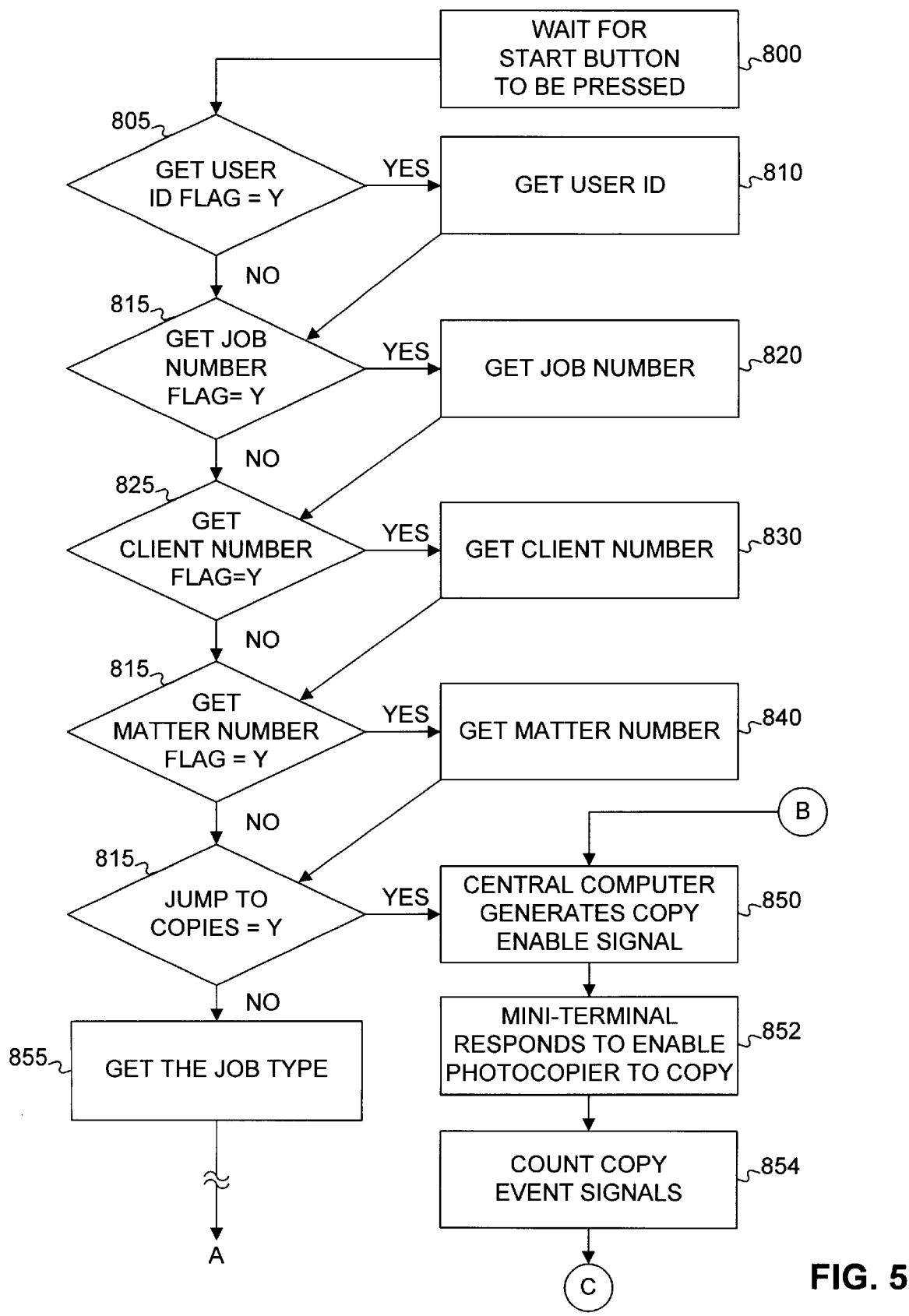
FIGS. 5 and 6 show a flow chart of the control program in the central control computer.
Figure 6:
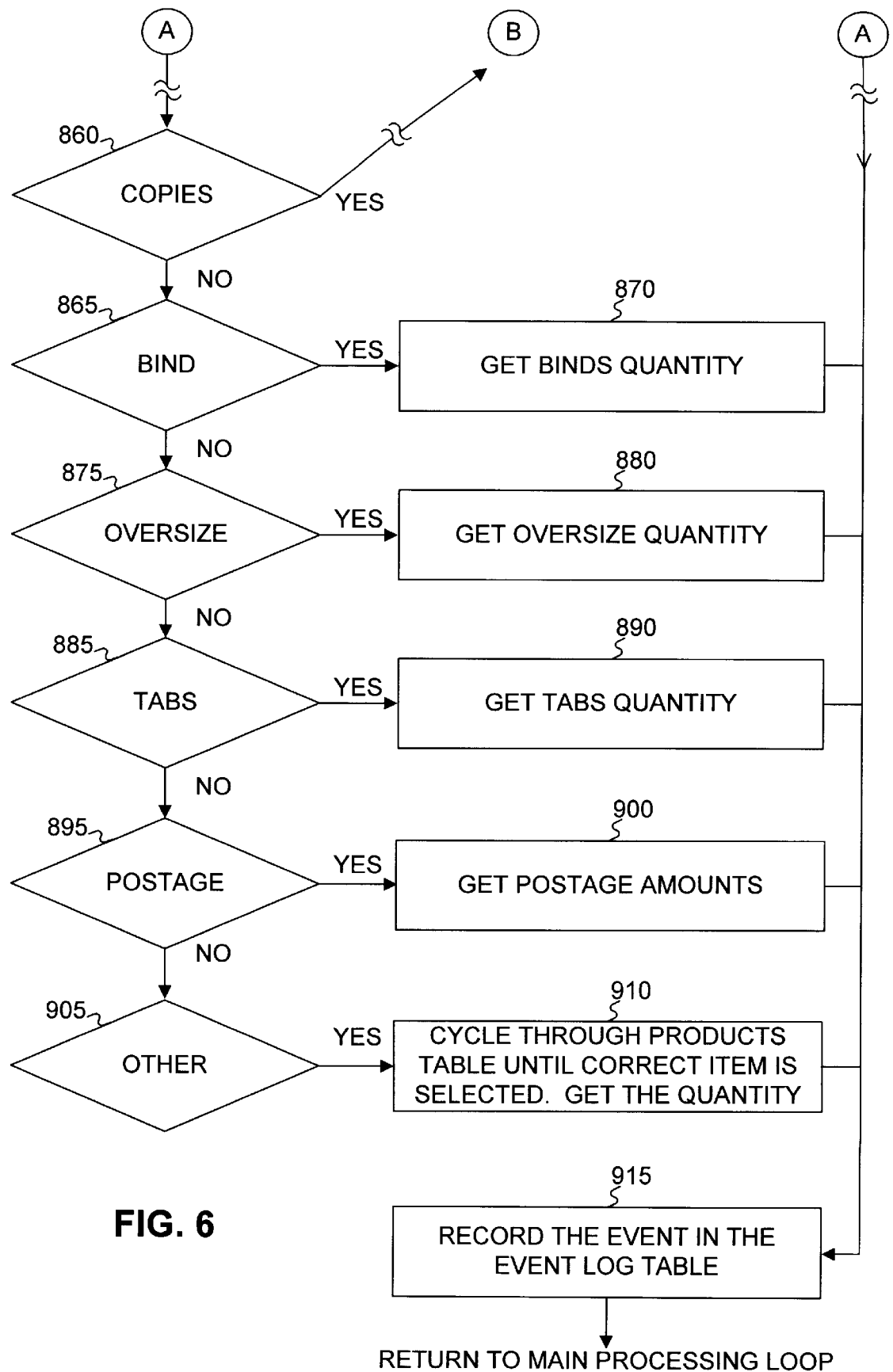

FIGS. 5 and 6 show a flow chart of the control program 330 located in the central control computer 300 used to record usage information. To begin activation of the program, the start button on the remote mini-terminal 100 is pressed in Step 800. The control program 330 begins by prompting for input based upon initialization parameters. The initialization parameters in the control program define whether certain information is to be obtained from an operator, such as user ID, job number, client number, matter number, job type (if more than one job is being monitored by the mini-terminal). The initialization parameters also determine whether to monitor only copying (if JumpTo-Copiesis enabled). If the flag for a particular initialization parameter is set to "Y", then the prompt will be made to require input for that parameter. For example, in step 810, the program will display a prompt for a user ID to be entered if it is determined that the GetUserID flag is set in step 805. The responses to the various prompts in steps 810–840 are verified by the central control computer and stored for later processing.

It should be understood that other billing identifiers can be used instead of client and matter numbers, that may consist of any combination of alphanumeric characters entered on the keyboard matrix 110.

If it is determined that the JumptoCopies flag is set in step 845, the central control computer responds by generating a copy enable signal in step 850. This signal is a first predetermined ASCII code such as ASCII "19". In step 852, the ROM in the remote mini-terminal 100 responds to the copy enable signal by applying 5 volts to the relay 142, which closes the enable circuit 410 in the photocopier 400, thereby enabling operation of the photocopier 400. Each copy event signal is counted in step 854 by the central control computer until a "finish" key on the mini-terminal 100 is pressed, or until a predetermined period of time elapses with no copies made and no input received. The central control computer 300 records the copy count information in step 915 in an event log table, there is a return to the main processing loop for the recording of the next event.

If it is determined that the JumptoCopies flag is not set in step 855 the program prompt is responsive to a key pressed on the keyboard of the mini-terminal to perform a desired operation in steps 860–900. That is, if the job type key pressed is "copies" in Step 860, the procedure continues from steps 850, 852, and 854 and each copy event is recorded in the event log table in step 915. If the job type key pressed is "bind" in step 865, then the number ofbinding operations performed is obtained in step 870. Following the recording of the copy events in step 854 or any of the other events in steps 870, 880, 890 or 990, and detection of a "finish" key pressed on the keyboard (or an expiration of a predetermined period of time since last keyboard input or counting activity) the event log table is updated in step 915 and there is a return to the main processing loop for the recording of the next event.

To disable the photocopier operation after a copy sequence is completed, the central control computer 300 generates a copy disable signal in the form of a second predetermined ASCII code, such as 20, and the remote mini-terminal 100 responds by grounding the relay 142, thus opening the enable switch 142. The control program is also configured to disable a photocopier in response to not receiving any information from the remote mini-terminal 100 for a predetermined period of time.

A major advantage of the photocopy tracking system according to the present invention is that it is less expensive than prior art systems because the processing and computing tasks are centralized at one location. Each remote mini-terminal 100 is a rather inexpensive device and does not include a computer. It has minimal "low-end" processing capabilities, but is still much less expensive than a computer. The system according to the present invention is capable of tracking photocopy and other related information from multiple locations where the mini-terminals are located. Thus, the term usage information is coined to include photocopy count, binding count, postage, tabs, and other information that must be tracked at multiple locations in an office-type environment.

The above invention has been described by way of example only. It will be appreciated by those with ordinary skill in the art that many modifications, additions, and deletions may be made without departing from the spirit and scope of the invention as set forth in the following claims.

We claim:

1. A system for managing operations of a plurality of photocopiers, the system comprising:

a plurality of remote mini-terminals, each remote mini-terminal being associated with at least one of a plurality of photocopiers and each remote mini-terminal having a keyboard to allow entry of authorization information and having a photocopier interface circuit to enable operation of an associated photocopier; and a central control computer coupled to the plurality of remote mini-terminals, the central control computer comprising a control program for enabling operation of at least one of the photocopiers via the photocopier interface circuit of a selected one of the mini-terminals, in response to authorization information received from the selected one of the mini-terminals.

2. The system of claim 1 further comprising a plurality of primary serial cables each coupling a remote mini-terminal to the central control computer.

3. The system of claim 2, wherein the photocopier interface circuit comprises:

a relay for connection to an enable circuit of an associated photocopier and responsive to a copy enable signal to close the enable circuit and thereby enable operation of the associated photocopier; and a low-pass filter for connection to an associated photocopier, the low-pass filter filtering a copy event signal generated by an associated photocopier each time a photocopy is made.

4. The system of claim 3, wherein the photocopier interface circuit is connected to the primary serial cable to couple the copy event signal to the central control computer.

5. The system of claim 4, and further comprising:

a plurality of secondary serial cables each connecting between a remote mini-terminal and its associated photocopier, the secondary serial cable including a first pair of conductors for connection to the enable circuit in an associated photocopier and a second pair of conductors for connection to an actuation circuit in the photocopier; and wherein the enable switch is connected to the first pair of conductors in a secondary serial cable and the low-pass filter of the photocopier interface circuit is connected to the second pair of conductors in the secondary serial cable.

6. The system of claim 4, and further comprising:

a plurality of secondary serial cables each connecting between a remote mini-terminal and its associated photocopier, the serial cable including a first pair of conductors for connection to the enable circuit in an associated photocopier; and wherein the enable switch is connected to the first pair of conductors in a secondary serial cable.

7. The system of claim 1, wherein the central control computer generates the copy enable signal in the form of a first predetermined ASCII code.

8. The system of claim 7, wherein the central control computer generates a copy disable signal in the form of a second predetermined ASCII code.

9. The system of claim 1, wherein the central control computer tracks usage information including copy count information detected from an associated photocopier, and other information entered at a remote mini-terminal, including postage, binding and tab information.

10. The system of claim 1, and further comprising:

a multiport connection device;

a multiport serial cable connecting the multiport connection device to the central control computer; and wherein the plurality of primary serial cables each connecting a remote miniterminal to the multiport connection device.

11. The system of claim 1, wherein the mini-terminal comprises a read only memory which is responsive to predetermined coded information generated by the central control computer to enable or disable an associated photocopier.

12. In a photocopy count system in which a central control computer receives and stores data from a plurality of remote mini-terminals each remote mini-terminal being coupled with at least one photocopier, a method comprising the steps of:

receiving billing identifier information at a central computer, from a selected remote mini-terminal of the remote mini-terminals;

determining at the central control computer whether the received billing identifier information is valid;

sending a copy enable signal from the central control computer to the at least one photocopier associated with the selected remote mini-terminal if the billing identifier information is determined to be valid;

enabling operation of the at least one photocopier associated with the selected remote mini-terminal in response to the copy enable signal being received at the associated photocopier; and relaying photocopy events detected at any one of the photocopiers to the central control computer for counting.

13. The method of claim 12, wherein the step of enabling operation of an associated photocopier comprises closing an enable circuit of the associated photocopier.

14. A circuit for interfacing with a photocopier in a system for tracking photocopy-related events and suitable for connection to a central control computer, the circuit comprising:

a relay at each of a plurality of remote mini-terminals for connection to an enable circuit of an associated photocopier and responsive to a copy enable signal generated by a central control computer to close the enable circuit and thereby enable operation of the associated photocopier; and a low-pass filter at each of a plurality of remote mini-terminals for connection to an associated photocopier, the low-pass filter filtering a copy event signal generated by an associated photocopier each time the photocopier makes a photocopy.

15. A computer readable medium having instructions which, when executed by a computer system, perform steps comprising:

receiving authorization information from any one of a plurality of input devices that are each uniquely associated with at least one of a plurality of photocopiers; and enabling operation of the at least one photocopier associated with the input device from which valid authorization information is received.

* * * * *